(12) United States Patent
Macy

(10) Patent No.: US 8,479,221 B2
(45) Date of Patent: Jul. 2, 2013

(54) AUTOMATIC PROCESSING OF AGRICULTURAL DATA

(75) Inventor: Ted S. Macy, Cumming, GA (US)

(73) Assignee: Pioneer Hi-Bred International, Inc., Johnston, IA (US)

(*) Notice: Subject to any disclaimer, the term of this patent is extended or adjusted under 35 U.S.C. 154(b) by 639 days.

(21) Appl. No.: 12/622,812

(22) Filed: Nov. 20, 2009

(65) Prior Publication Data

US 2011/0126211 A1   May 26, 2011

(51) Int. Cl.
*G06F 3/00* (2006.01)

(52) U.S. Cl.
USPC .......................................................... 719/318

(58) Field of Classification Search
USPC .......................................................... 719/318
See application file for complete search history.

(56) References Cited

U.S. PATENT DOCUMENTS

| | | | | |
|---|---|---|---|---|
| 6,741,934 B2* | 5/2004 | Chen et al. | ..................... | 701/461 |
| 7,072,746 B1* | 7/2006 | Burch | ............................. | 701/14 |
| 7,376,546 B2* | 5/2008 | Dominguez et al. | ............ | 703/20 |
| 7,518,986 B1* | 4/2009 | Chadalavada et al. | ........ | 370/218 |
| 8,040,105 B1* | 10/2011 | Craine | ......................... | 320/114 |
| 2003/0200096 A1* | 10/2003 | Asai | ............................... | 704/275 |
| 2004/0021862 A1* | 2/2004 | Panigrahi et al. | ............. | 356/326 |
| 2004/0059737 A1* | 3/2004 | Beck et al. | ..................... | 707/100 |
| 2004/0073443 A1* | 4/2004 | Gabrick et al. | ................... | 705/1 |
| 2004/0078514 A1 | 4/2004 | Kung et al. | | |
| 2005/0010635 A1* | 1/2005 | Schwesig et al. | ............. | 709/203 |
| 2007/0021944 A1* | 1/2007 | Levy | ............................. | 702/188 |
| 2008/0236902 A1* | 10/2008 | Imaizumi | ................... | 178/18.01 |
| 2009/0132330 A1* | 5/2009 | Shaw et al. | ....................... | 705/9 |

OTHER PUBLICATIONS

M. Barbier, Implementation and flight testing of an onboard architecture for mission supervision, Apr. 2006.*
"AgDirector Users Guide", MapShots, Inc., www.mapshots.com (2009) 8 pages.

* cited by examiner

*Primary Examiner* — Lechi Truong
(74) *Attorney, Agent, or Firm* — Alston & Bird LLP

(57) ABSTRACT

Methods for agricultural data management include automatically monitoring for events associated with receipt of agricultural data through use of a service executing on a computing device, notifying at least one component of a software system executing on the computing device of the receipt of the agricultural data, processing the agricultural data by the at least one component and storing the agricultural data in a data repository, and automatically distributing the agricultural data from the data repository in a predetermined format.

14 Claims, 7 Drawing Sheets

AUTOMATIC PROCESSING OF AGRICULTURAL DATA

FIELD OF THE INVENTION

The present invention relates to agricultural data such as agricultural field operation data. More particularly, the present invention relates to the automatic handling of such data.

BACKGROUND

Agriculture is increasingly becoming a more technologically complex industry. One example of this complexity relates to the use of agricultural data such as agricultural field operation of data. Typically, such data includes geoposition data such as Global Positioning System (GPS) time-stamped data associated with a field operation, measurement, or other item of data. Such data may be used by a number of different parties in a number of different ways.

For example, an agricultural producer may collect such data using their equipment. Different producers may use different types of equipment with different data formats. The agricultural producer may share the collected data with others such as a seed company, a chemical company, or other agricultural input supplier. In addition, the agricultural producer may share the collected data with farm managers, crop consultants, landlords, agronomists, governmental bodies or others.

Despite widespread collection of agricultural data and the recognition of its usefulness to numerous parties, there are significant problems, which prevent or present obstacles to its distribution and use.

Among these is that data may be collected in a number of different formats. Also, various applications that may support the use of agricultural data may require a particular format. Thus, in order for collected data to be used, it must be converted into another format. If the agricultural producer provides the data to another, the agricultural producer may need to convert the collected data into a particular format.

What is needed is a method and system for agricultural data management which is automatic and convenient.

SUMMARY

According to one aspect, a method for agricultural data management includes automatically monitoring for events associated with receipt of agricultural data through use of a service executing on a computing device. The method may further include notifying at least one component of a software system executing on the computing device of the receipt of the agricultural data. The method may further include processing the agricultural data by the at least one component and storing the agricultural data in a data repository. The method may further include automatically distributing the agricultural data from the data repository in a predetermined format.

According to another aspect, a method for agricultural data management may include providing a software system stored on a computer readable medium for executing on a computing device, the software system having a kernel, at least one trigger component for monitoring events, at least one manager component, and at least one communicator component. The method may further include electronically receiving agricultural data from the computing device, wherein the agricultural data is sent from the software system using at least one communicator component.

According to another aspect, an article for use on a computing device is provided. The article includes a computer readable medium storing a software application configured for monitoring for events associated with receipt of agricultural data through use of a service executing on the computing device, notifying a converter component executing on the computing device of the receipt of the agricultural data, processing the agricultural data by the converter component, storing the agricultural data in a data repository, and automatically distributing the agricultural data in a predetermined format by a communicator. The software application executes on the computing device.

DETAILED DESCRIPTION

In one application, a software system receives, processes, and transfers agricultural data electronically to service providers without the need for human intervention. One example of agricultural data is as-applied data. As-applied data can include data associated with planting, harvesting, applying chemicals or other types of agricultural operations. Another example of agricultural data is environmental data. Environmental data can include soil testing data from soil labs or otherwise, remotely sensed imagery data, weather data, and other types of data.

The software system includes a central kernel and three main components. As used here, the term "kernel" refers to a software component which is central to the operation of a software system and manages the interaction of the other components. The first type of components includes triggers. Triggers are services that may run on a background thread that monitors a computer system for certain events. Events can include, without limitation, the insertion of a memory card, the receipt of an email from a certain sender or with a specific message text, a wireless data transfer through a specific port, synchronization with a mobile device (such as, without limitation, a mobile phone or PDA) or other event. When a specific event is "triggered", the trigger will send the message to a kernel that new data has arrived.

The second type of component is a converter. Converters are responsible for archiving proprietary data formats, and converting the archived data into a common format. Upon notification of receipt of new data by a trigger, the kernel notifies each converter that new data has arrived and query whether the converter knows how to process the data that was just received. If appropriate, the kernel will command the converter to archive the newly arrived proprietary data, and convert the data into a common format The communicator packages the data processed by a converter for transfer and may send the processed data to another computer system. The communicator may log-into a remote system with the proper credentials in order to deliver the data. Thus, in this manner data can be quickly distributed in the proper format automatically and without the need for human intervention.

Figure 1:
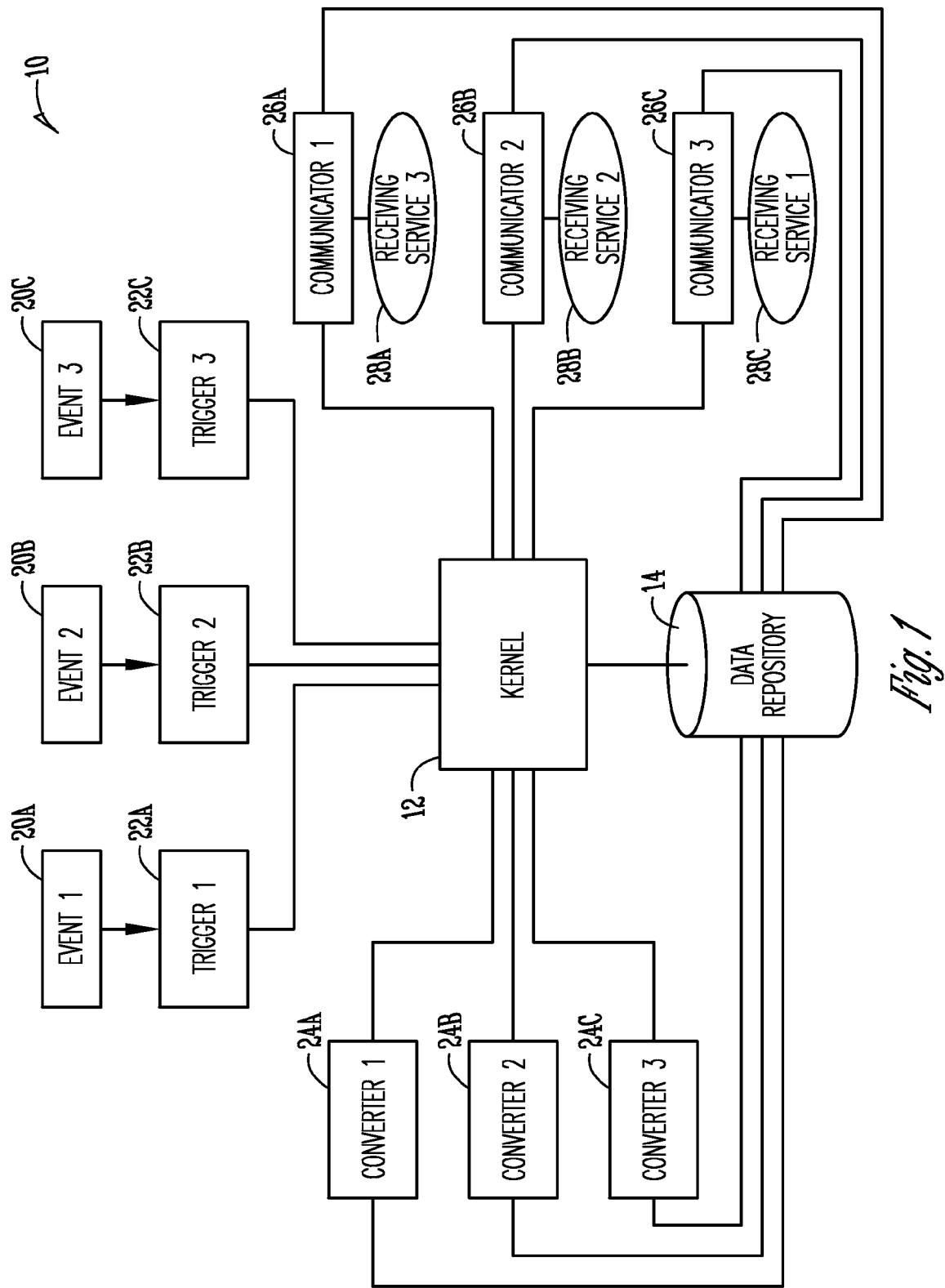
FIG. 1 is a block diagram illustrating one example of a system for automatically detecting, processing, and distributing agricultural data.

FIG. 1 is a block diagram of one example of a software system 10. The software system 10 has a kernel 12. The kernel 12 sends and/or receives messages from various component parts of the software system 10. In FIG. 1, multiple events 20A, 20B, 20C are present. The events 20A, 20B, 20C correspond with triggers 22A, 22B, 22C respectively.

Thus, for example, a first event 20A corresponds with a first trigger 22A. A second event 20B corresponds with a second trigger 22B. A third event 20C corresponds with a third trigger 22C. Events can include, without limitation, the insertion of a memory card or other type of removable media, the receipt of an email from a certain sender or with a specific message text, a wireless data transfer through a specific port, synchronization with a mobile device, or other event.

Upon the occurrence of an event, each trigger 22A, 22B, 22C will message or otherwise alert the kernel 12. The kernel 12 will then message one or more converter components, 24A, 24B, 24C. The message may, for example, notify each converter component that new data has arrived and query whether or not the converter component knows how to process the data. The converter components may be plug-in components that process specific data formats. Each converter component's functions include performing pre-defined instructions.

One or more of the converter components may then process the data, placing the processed data into the data repository 14. Status information may also be placed in the data repository 14. The data repository may be a local data repository, a remote data repository, or a combination thereof. Thus, upon occurrence of a triggering event, agricultural data is recognized as such and stored within the data repository.

The kernel 12 is also in operative communication with communicators 26A, 26B, 26C. When data is available in the data repository 14, the kernel 12 may communicate with each of the communicators that data is available. If the data available is of interest to the communicator, then the communicator may communicate data from the data repository 14 to one or more receiving services. As shown in FIG. 1, receiving service 28A is associated with communicator 26A, receiving services 28B is associated with communicator 26B, and receiving service 28C is associated with communicator 26C. The receiving services may be software executing on computers associated with various farm management information systems or other information systems.

Figure 2:
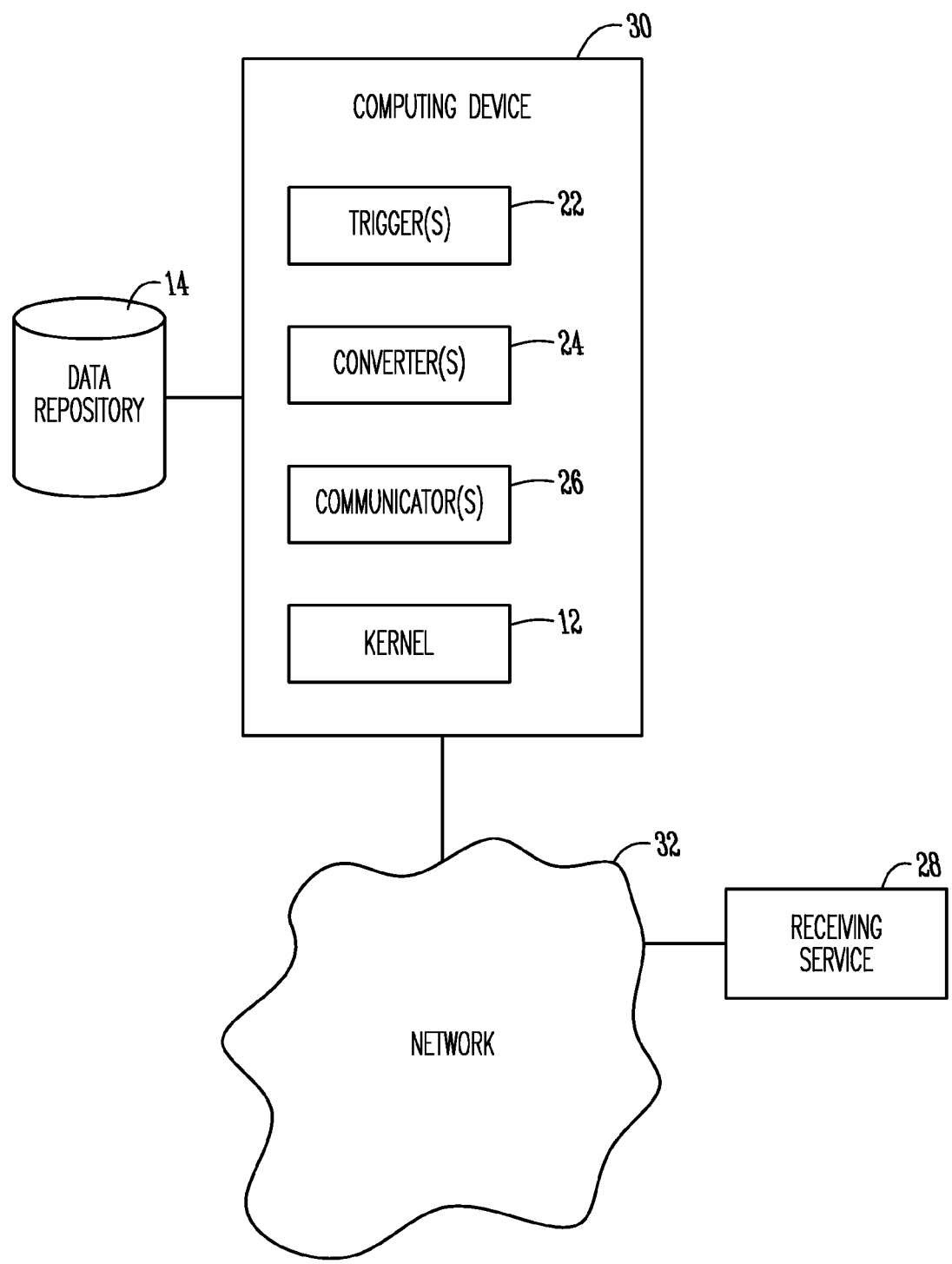
FIG. 2 is another diagram of one example of a system for automatically detecting, processing, and distributing agricultural data.

FIG. 2 illustrates a computing device 30. The computing device 30 includes a computer readable storage medium upon which instructions or software code is stored for executing various software components including the kernel 12, one or more triggers 22, one or more converter components 24, and one or more communicators 26. The computing device is operatively connected to a data repository 14. The data repository 14 may be a part of the computing device 30 or the data repository 14 may be located remotely, such as across a network. The computing device 30 is operatively connected to a network 32. Through the network 32, the computing device 30 is in operative communication with one or more receiving services 28. Alternatively, one or more of the receiving services may be located on the computing device.

Figure 3:
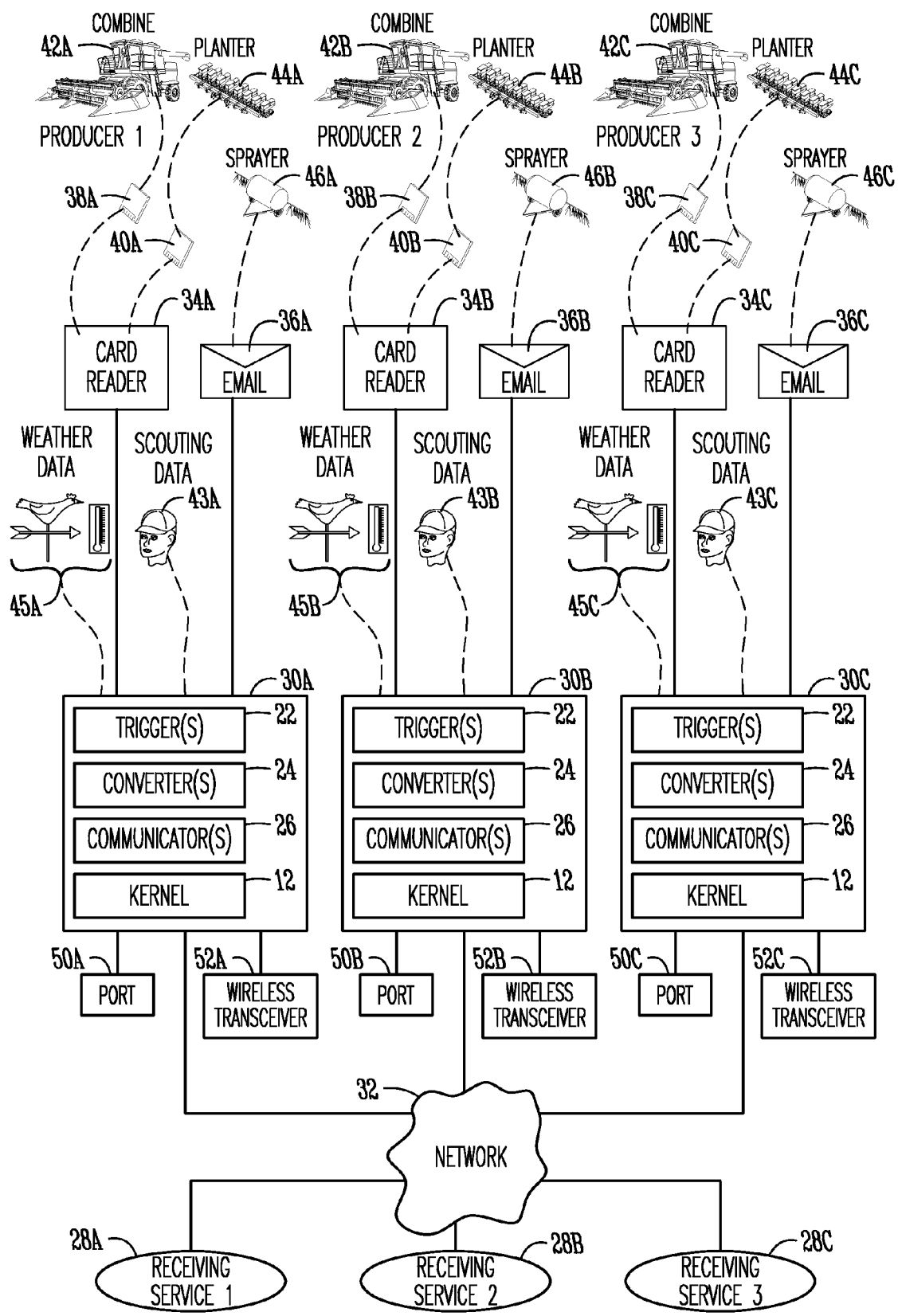
FIG. 3 is a diagram illustrating one example of a system for automatically detecting, processing, and distributing agricultural data.

FIG. 3 illustrates how the complexities associated with handling of agricultural data may be addressed. In the example shown in FIG. 3, agricultural producers collect various types of agricultural data which may be processed and routed. In FIG. 3, there are receiving services 28A, 28B, 28C which receive agricultural data. Each of the receiving services may be associated with an organization with whom producers have a relationship and which use the data of the agricultural producers in one way or another. Examples of types of organization may include seed companies, agricultural chemical companies, agricultural management or consulting companies, organizations within the agricultural supply chain, or other type of companies. Additionally, the organization(s) may be a governmental or regulatory authority. Of course, the receiving services may be internal to the organization associated with the agricultural producers and need not be an organization external from an agricultural producer.

The multiple receiving services 28A, 28B, 28C each may collect data from a plurality of different producers, each of whom may have data from any number of sources. Sources of data may include, without limitation, farm equipment and/or associated monitors and instrumentation, weather stations, and handheld units (or other mobile devices) such as those used by crop scouts, or other types of data sources associated with agriculture. For example, in FIG. 3, a producer may have harvest data associated with a combine 42A, 42B, 42C. The harvest data may include global positioning system (GPS) data which includes position information such as latitude, longitude, and altitude in addition to time data and operations data. Harvest data may include, without limitation, yield data, moisture data, or other type of harvest data. The producer may also have planting data which includes data associated with a planter 44A, 44B, 44C. The planting data may include position data, time data, and operations data. The operations data may relate to the type of seed planted, planting density, or other type of planting data. The producer may also have chemical data such as data associated with a sprayer 46A, 46B, 46C. The chemical data may include data related to the sprayer and operations data as well as GPS data. The data related to the sprayer may include data associated with the type of chemicals being sprayed, their concentrations, and related data. Such harvest data, planting data, and chemical data are nonexclusive examples of as-applied data.

The producer may also have weather data 45A, 45B, 45C. The weather data 45A, 45B, 45C may be generated by automatic weather stations, manual entry, or otherwise. The weather data 45A, 45B, 45C, may include temperature data, precipitation data, wind data, humidity data, or other weather-related data. The weather data 45A, 45B, 45C, may be wirelessly communicated to the computing devices 30A, 30B, 30C such as through wireless transceivers 52A, 52B, 52C. For example, the weather data 45A, 45B, 45C may be stored on removable media and transferred to the computing device 30A, 30B, 30C through a card reader 34A, 34B, 34C. The weather data 45A, 45B, 45C may also be communicated through a port 50A, 50B, 50C.

In addition to weather data 45A, 45B, 45C, other types of data may be used. Weather data is one form of environmental data. Another example of environmental data is crop scouting data 43A, 43B, 43C. Crop scouting data may include data obtained through observations of a crop and/or observations of its environment. Although the data can be recorded in various ways, one way such information may be collected is with a handheld or mobile device. When data is collected in this way, the data may be communicated to a computing device 30A, 30B, 30C through wireless communications, through a port, through removable media, through email, or otherwise. Other types of environmental data may include soil data.

Data associated with the agricultural equipment may be conveyed to the computer 30A, 30B, 30C in any number of ways. One way is that the agricultural data is stored on a removable storage device such as a card 38A, 38B, 38C, 40A, 40B, 40C. Alternatively, the data could be sent in an email 36A, 36B, 36C to the computer 30A, 30B, 30C. Of course, the data could otherwise be communicated such as through a wireless network or otherwise. It should be further noted that the agricultural data associated with a particular producer is not necessarily collected by the producer but could be collected by another and then communicated to the producer. For example, the producer could outsource chemical applications for a crop to another who collects the data and then emails the agricultural data to the agricultural producer. Similarly, a producer may enlist a crop scout or consultant to provide data associated with a crop or its environment.

As shown in FIG. 3, a receiving service 28A, 28B, 28C may receive agricultural data from any number of different producers. Each organization receiving data may develop and/or distribute their own communicator 26 to package data and send it electronically in the format they wish to the location they desire. Each organization may have their own receiving service 28A, 28B, 28C, which may be associated with a farm information management system or other type of information system.

Figure 4:
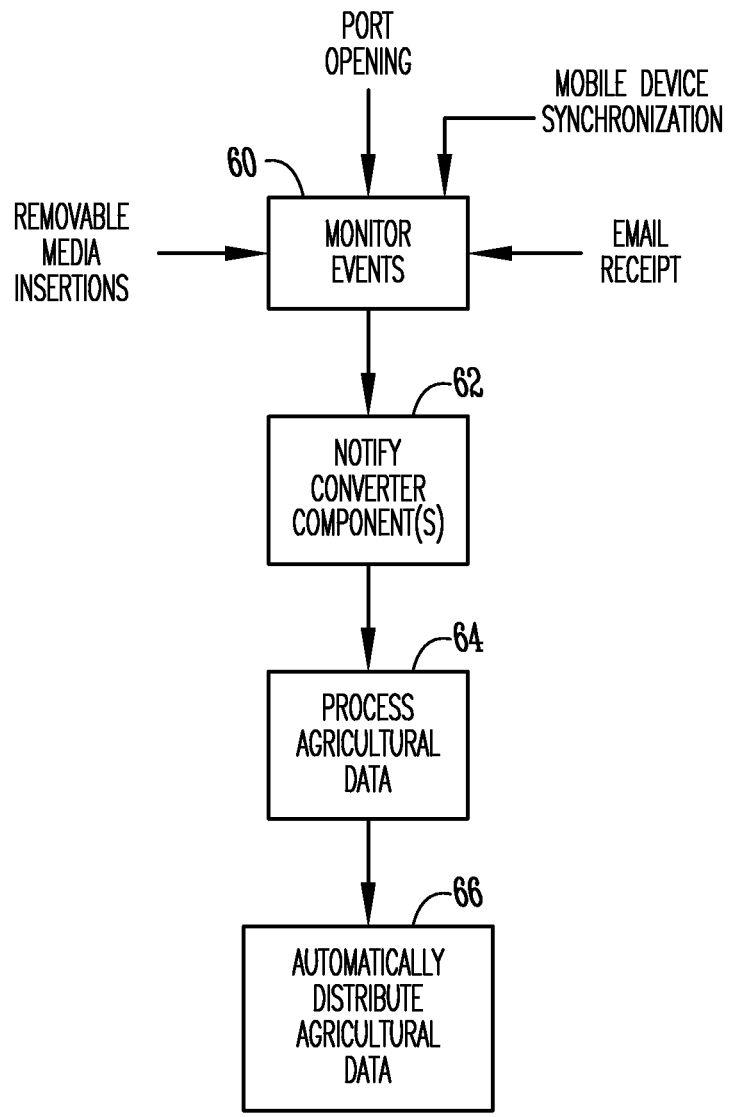
FIG. 4 is a flow chart illustrating one example of a method for automatically detecting, processing, and distributing agricultural data.

FIG. 4 illustrates one example of a method. In step 60, events are monitored. Examples of such events may include, without limitation, an insertion of removable media such as the insertion of a memory card, receipt of an email meeting predetermined criteria (such as being from a particular sender or addressed to a particular recipient), or the opening of a particular port or receiving agricultural data at the port. Other events may include a synchronization event such as connection of a handheld device or mobile device to a computer. Of course, other types of events may also be monitored. These triggering events may be monitored by using a service running on a computing device that performs the monitoring. The service can monitor for any number of user-defined triggers, with a trigger for each type of event which is being monitored. Once a trigger identifies the occurrence of an event, the service may alert a kernel.

Next in step 62, one or more converter components are notified of the occurrence of a particular event. This may occur by having the service used for monitoring alert a kernel and having the kernel query different converter components as to interest in the event. Then in step 64, the agricultural data associated with the event is processed. The processing may include manipulating the agricultural data to meet a particular format or other requirements. It may also include archiving the received data into a repository for safe-keeping. The processing may include deleting data fields, adding data fields, or modifying data fields. Then in step 66, the agricultural data as processed is automatically or electronically distributed, such as to one or more service providers. In this manner, data can be automatically handled so that once received it may be processed and distributed in a convenient and seamless manner.

Figure 5:
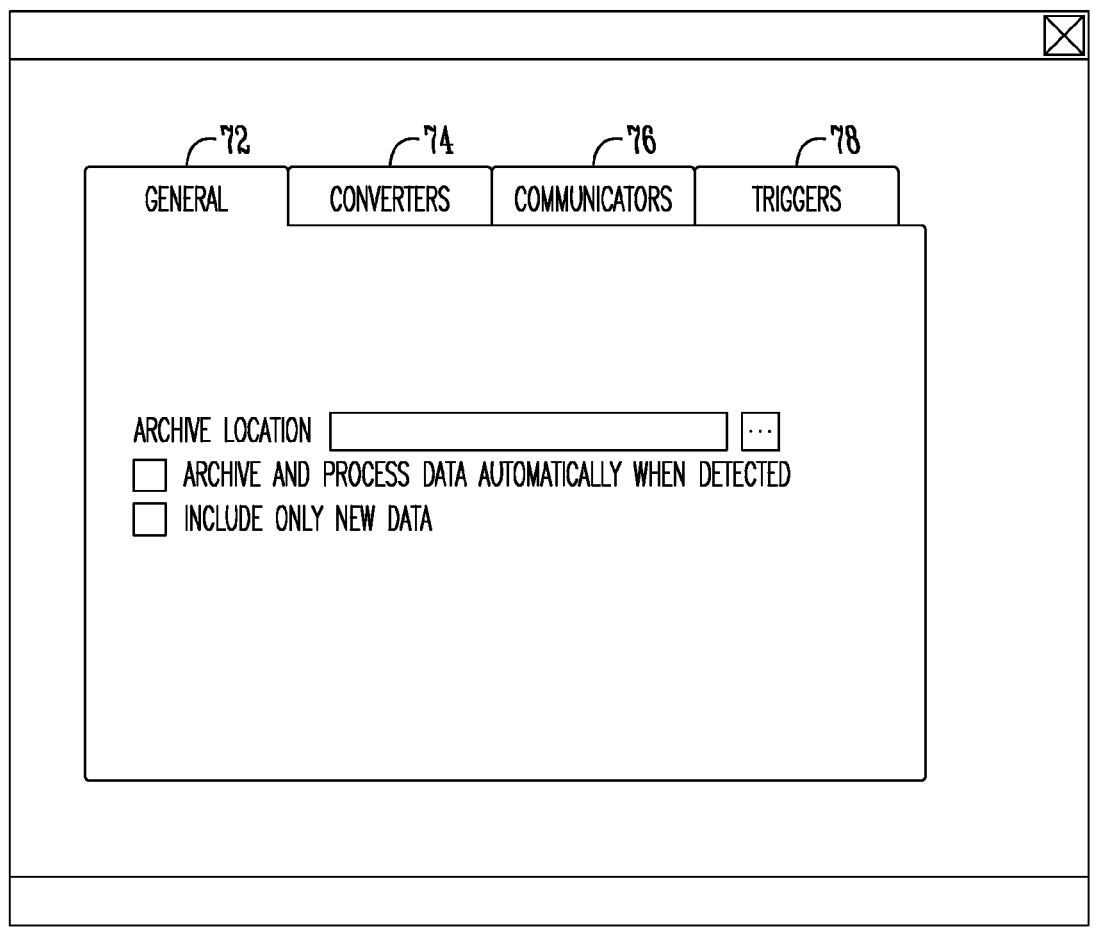
FIG. 5 illustrates a screen display showing tabs in which a user can set various options such as those associated with converters, communicators, or triggers.

The steps may be performed by a software system executing on a computer. FIG. 5 illustrates one example of a user interface for the software system that allows a user to set various options. As shown in FIG. 5, a screen display 70 is presented on a display associated with a computing device used by a user. The screen display 70 includes a plurality of tabs including a general tab 72, a converters tab 74, a communicators tab 76, and a triggers tab 78. A user may select each tab to set options associated with the tab. For example, in the general tab 72, a user may be presented with options regarding an archive location for agricultural data. In addition, a user may specify that they want the agricultural data to be archived and processed automatically when detected. The user may also be presented with other options such as whether or not they want to include only new data instead of all data.

Figure 6:
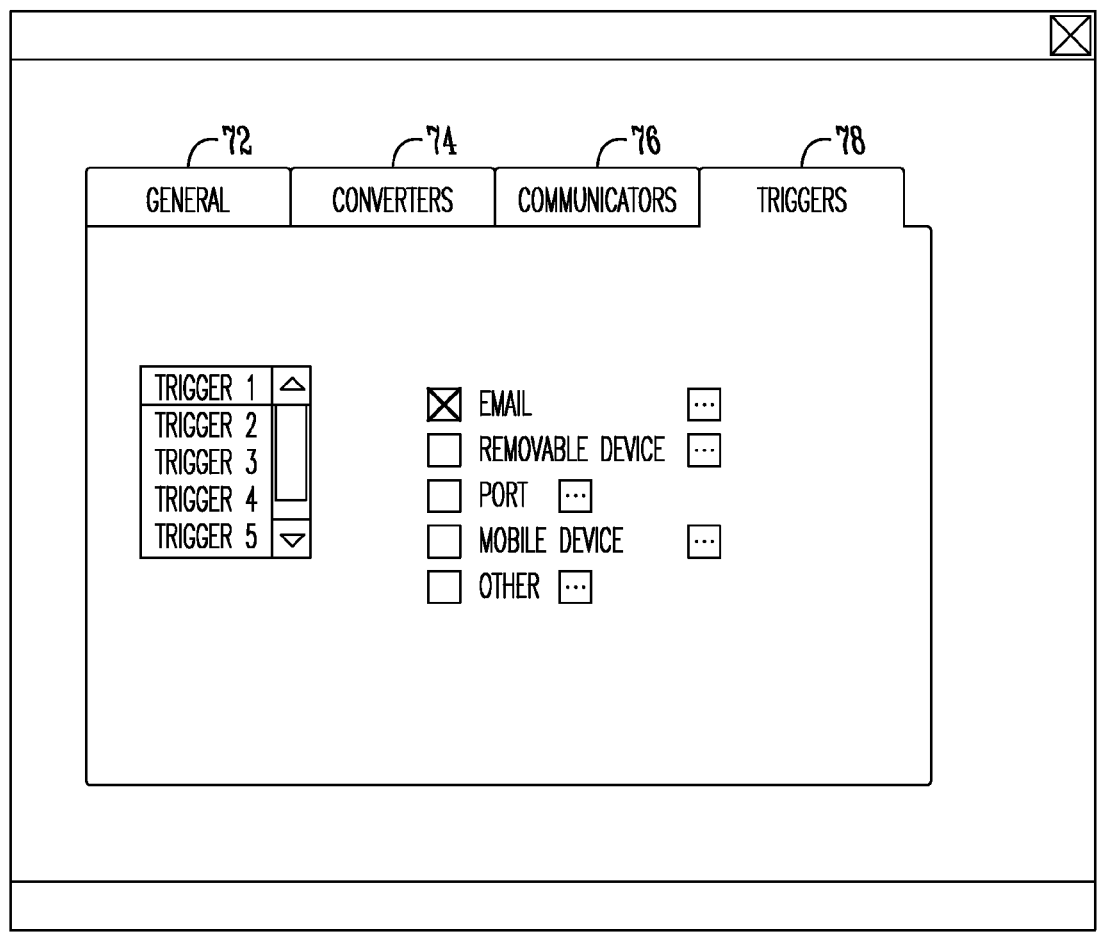
FIG. 6 illustrates one example of a triggers tab within a software application which may be used to set various options associated with triggers.

FIG. 6 illustrates one example of a trigger tab 78 which displays multiple triggers and allows a user to specify the type of trigger. For example, if the trigger is an email trigger, then the user may specify email properties associated with the trigger such as an email address from which the agricultural data is received, or a particular word or phrase in the subject line of the email or other such email parameters. Similarly, if the trigger is a removable device trigger, a user may specify the type of device or drive letter associated with the trigger. Similarly, if the trigger is associated with the opening of or use of a particular port, a user may specify the port and related port parameters. It is also contemplated that other types of triggers may be used and that parameters for these triggers may also be specified. Thus, in this manner a user may configure one or more triggers.

Figure 7:
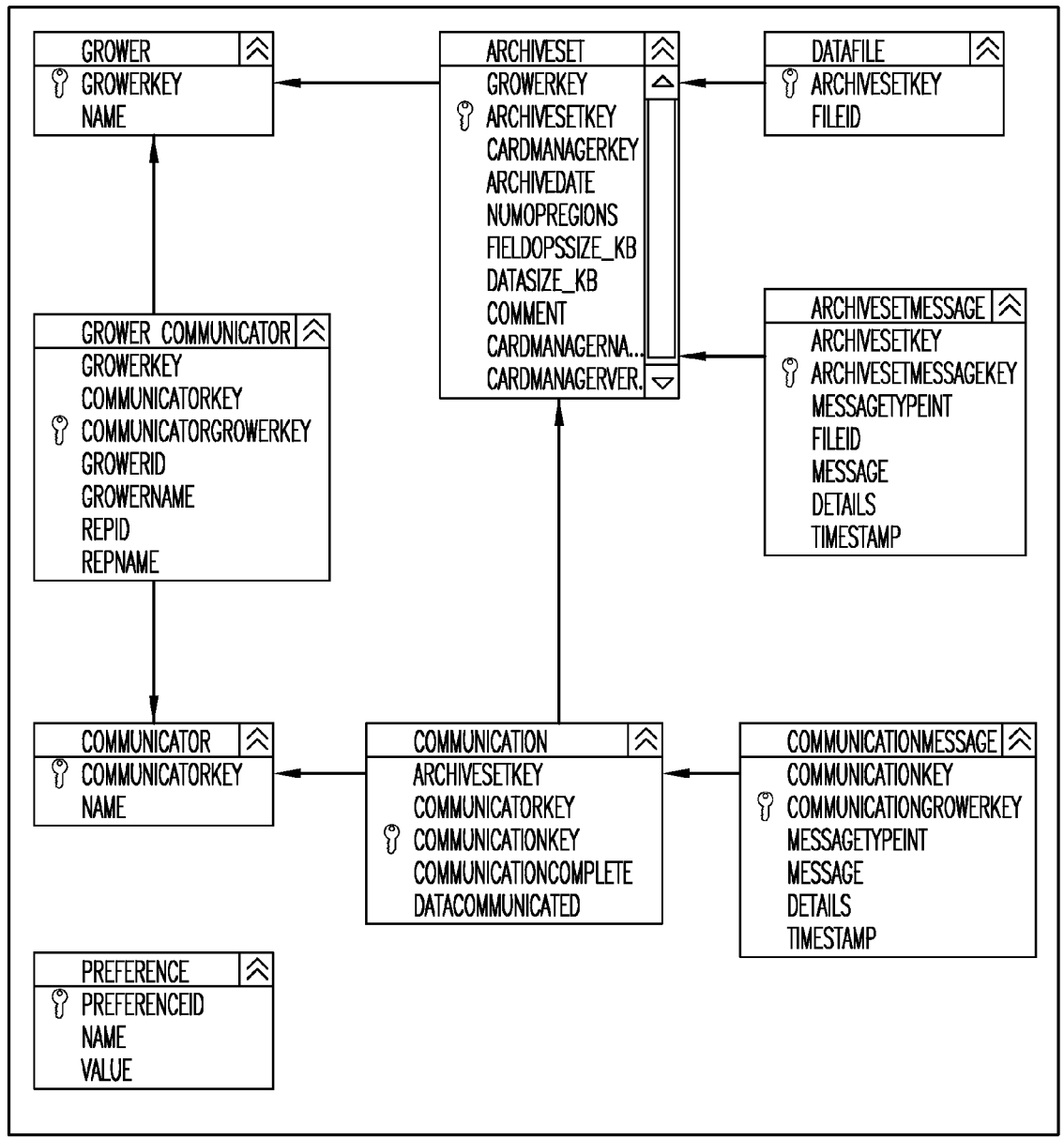
FIG. 7 illustrates one example of a schema for the data repository.

FIG. 7 illustrates one example of a schema for the data repository 14. The data repository contains agricultural data placed there by one or more converter components. One or more communicator components accesses the data repository 14, process the data if needed and communicates the resulting processed data to one or more receiving services. As shown in FIG. 7, the schema of the data repository 14 may allow for maintaining information about the grower, about the data, and other information. Such information may be used by one or more communicator components to assist in processing the data. Thus, the use of such a schema is advantageous in that it provides flexibility in how the agricultural data can be processed. In addition, the schema of the data repository 14 allows for determining what data has been communicated using a communicator and what data has not. Thus, after data has been communicated to all communicators, the data may be deleted from the repository, if desired.

The system and methods provide a number of advantages. First, convenience is provided for both the producers as well as those who receive and use the data. The producers need only have their agricultural production data be communicated to their computer which will then distribute the data in an appropriate format to the proper organizations or locations. This reduces the time and effort required by the producers to share their agricultural data. Convenience is provided to receiving parties which through the communicators are able to specify the format of data and the method of receiving the data. Thus, compatibility issues are avoided. In addition, the service providers receive the data more quickly as there is no wait for users to process the data and communicate it. Also, the automated system does not burden the relationship between the service providers and the producers as the process happens automatically and seamlessly from the producer's perspective.

Therefore, methods and systems for automatic processing of agricultural data have been described. Although particular examples have been provided, the present invention is not to be limited to the particular examples provided herein as the present invention contemplates numerous variations, options, and alternatives.

What is claimed is:

1. A method for agricultural data management, comprising:

automatically monitoring a computing device for events associated with receipt of agricultural data at the computing device through use of a service executing on the computing device;

notifying at least one component of a software system executing on the computing device of the receipt of the agricultural data by sending a message from the service executing on the computing device to a kernel executing on the computing device;

processing the agricultural data by the at least one component and storing the agricultural data in a data repository; and automatically distributing the agricultural data from the data repository in a predetermined format.

2. The method of claim 1 further comprising sending a message from the service executing on the computing device to a kernel executing on the computing device upon occurrence of the events.

3. The method of claim 1 wherein the notifying the at least one component comprises sending a message to each of the at least one component from a kernel executing on the computing device.

4. The method of claim 1 wherein the automatically distributing comprises sending the agricultural data from the data repository to a receiving service.

5. The method of claim 4 wherein the sending the agricultural data from the data repository to the receiving service is performed by at least one communicator component.

6. The method of claim 5 wherein the at least one communicator component formats the agricultural data for use by the receiving service.

7. The method of claim 1 wherein at least one of the events comprises insertion of a memory card, a wireless data transfer through a port, a synchronization event with a mobile device, or receipt of an email.

8. The method of claim 1 wherein the agricultural data comprises geoposition data.

9. The method of claim 8 wherein the agricultural data further comprises as-applied data.

10. The method of claim 8 wherein the agricultural data further comprises environmental data.

11. The method of claim 1 wherein the automatically monitoring for events is performed by at least one trigger component executing on the computing device.

12. The method of claim 11 further comprising receiving user inputs for use in defining triggers associated with the at least one trigger component.

13. The method of claim 1 further comprising defining events associated with the receipt of the agricultural data.

14. The method of claim 13 wherein the step of defining events comprises using user-specified parameters to assist in defining the events associated with the receipt of the agricultural data.

* * * * *